United States Patent [19]

Fujino et al.

[11] Patent Number: 4,831,502
[45] Date of Patent: May 16, 1989

[54] HEADLIGHT DEVICE

[75] Inventors: Yuuji Fujino; Masayasu Endoh, both of Shimizu, Japan

[73] Assignee: Koito Seisakusho Co., Ltd., Tokyo, Japan

[21] Appl. No.: 209,377

[22] Filed: Jun. 21, 1988

[30] Foreign Application Priority Data

Apr. 5, 1988 [JP] Japan .................................. 63-83898

[51] Int. Cl.$^4$ .............................................. B60Q 1/04
[52] U.S. Cl. ..................... 362/61; 363/297; 363/310; 363/346
[58] Field of Search ...................... 362/61, 80, 83, 236, 362/242, 245, 297, 307, 310, 346, 347, 350

[56] References Cited

U.S. PATENT DOCUMENTS

| | | | |
|---|---|---|---|
| 4,196,459 | 4/1980 | Dick | 362/66 |
| 4,249,232 | 2/1984 | Dick | 362/61 |
| 4,569,007 | 2/1986 | Dick | 362/294 |
| 4,621,307 | 11/1986 | Weber | 362/66 |
| 4,712,164 | 12/1987 | McMahan et al. | 362/66 |
| 4,722,033 | 1/1988 | Van Duyn et al. | 362/80 |
| 4,772,987 | 9/1988 | Kretschmer et al. | 362/61 |

Primary Examiner—Stephen F. Husar
Attorney, Agent, or Firm—Browdy & Neimark

[57] ABSTRACT

A headlight device of the type including a lamp body formed of a synthetic resin material, a lens covering the front surface of the lamp body, an electric bulb provided in a lamp space defined between the lamp body and the lens, and a clearance lamp provided adjacent to one side edge of the lamp body. The lamp body has a parabolic surface reflective mirror portion opening in the forward direction, and an auxiliary reflective mirror portion extending from the left or right side edge portion of the parabolic surface reflective mirror portion of the side of the clearance lamp. The auxiliary reflective mirror portion is generally inclined in the direction toward the distal edge of the lens, and has a concave inner surface. The lens has a front surface portion, and at least one side wall portion extending in the rear direction from the side edge of the front surface portion adjacent to the clearance lamp. An extension of a line connecting the source of light of the electric bulb and a boundary between the side edge of the parabolic surface reflective mirror portion and the side edge of the auxiliary reflective mirror portion passes on or in front of the front end of the side wall portion of the lens on the side of the clearance lamp.

6 Claims, 6 Drawing Sheets

HEADLIGHT DEVICE

FIELD OF THE INVENTION

The present invention relates to a headlight device for use in a vehicle such as an automobile and the like and, particularly to a headlight device having a large size in the transverse direction and incorporating on one side thereof a clearance lamp.

DESCRIPTION OF PRIOR ART

Recently, the headlight devices of an automobile are formed to have increased size, particularly in the transverse direction due to the design of the vehicle body. Further, a clearance lamp is provided adjacent to one side of the headlight device to constitute a large integral lamp assemblies.

Various problems have been encountered in increasing the width, such that the depth or the longitudinal size will also increase, since when the width of the headlight device is increased the depth of a reflective mirror usually having a rotational parabolic surface increases excessively. Thus, the depth of the headlight device increases and the mounting space in the vehicle body will correspondingly increase.

One countermeasure for reducing the depth of the headlight device is to restrict the width and depth of the parabolic reflective mirror to some amount and to provide an extension member between each of the said edges of the reflective mirror and corresponding side edge of a lens or of an opening in the front surface of the headlight device. However, when the headlight device is not lit and is seen from the outside, the part of the lens corresponding to the extension member is dark as compared with the remaining part of the lens since the reflectivity of the extention member is inferior as compared with the parabolic reflective mirror, and the attractiveness of the headlight device is impaired. Further, the extension member increases the number of parts, the manufacturing cost and the assembling labour.

Further, when a clearance lamp is provided adjacent to the main headlight device, there is a problem that the light passing through the lens of the main headlight may pass through the lens of the clearance lamp.

SUMMARY OF THE INVENTION

An object of the present invention is to overcome the shortcomings in the prior art devices and, according to the invention, there is provided a headlight device of the type including a lamp body formed of a synthetic resin material, a lens covering the front surface of the lamp body and an electric bulb provided in a lamp space defined between the lamp body and the lens, further including a clearance lamp provided adjacent to one side edge of the lamp body, wherein the lamp body has a parabolic surface reflective mirror portion opening in the forward direction, and auxiliary reflective mirror portions extending from the left and right side edge portions of the parabolic surface reflective mirror portion; the auxiliary reflective mirror portions approach the lens in the direction toward the distal edges thereof respectively, and have concaved surfaces respectively in the forward direction; the lens has a front surface portion and at least one side wall portion extending in the rear direction from one side edge of the front surface portion; and an extension of a line connecting the source of light of the electric bulb and a boundary between the side edge of the parabolic surface reflective mirror portion and the side edge of the auxiliary reflective mirror portion passes on or in front of the front end of the side wall portion of the lens on the side of the clearance lamp.

Therefore, the part of the lens corresponding to the auxiliary reflective mirror portion can sufficiently be illuminated and, further, the light emitted from the main light source does not interfere the clearance lamp.

BRIEF DESCRIPTION OF THE DRAWINGS

Further objects and advantages of the invention will become apparent from the following detailed description in conjunction with accompanying drawings, in which.

DETAILED DESCRIPTION OF PREFERRED EMBODIMENTS

Figure 1:
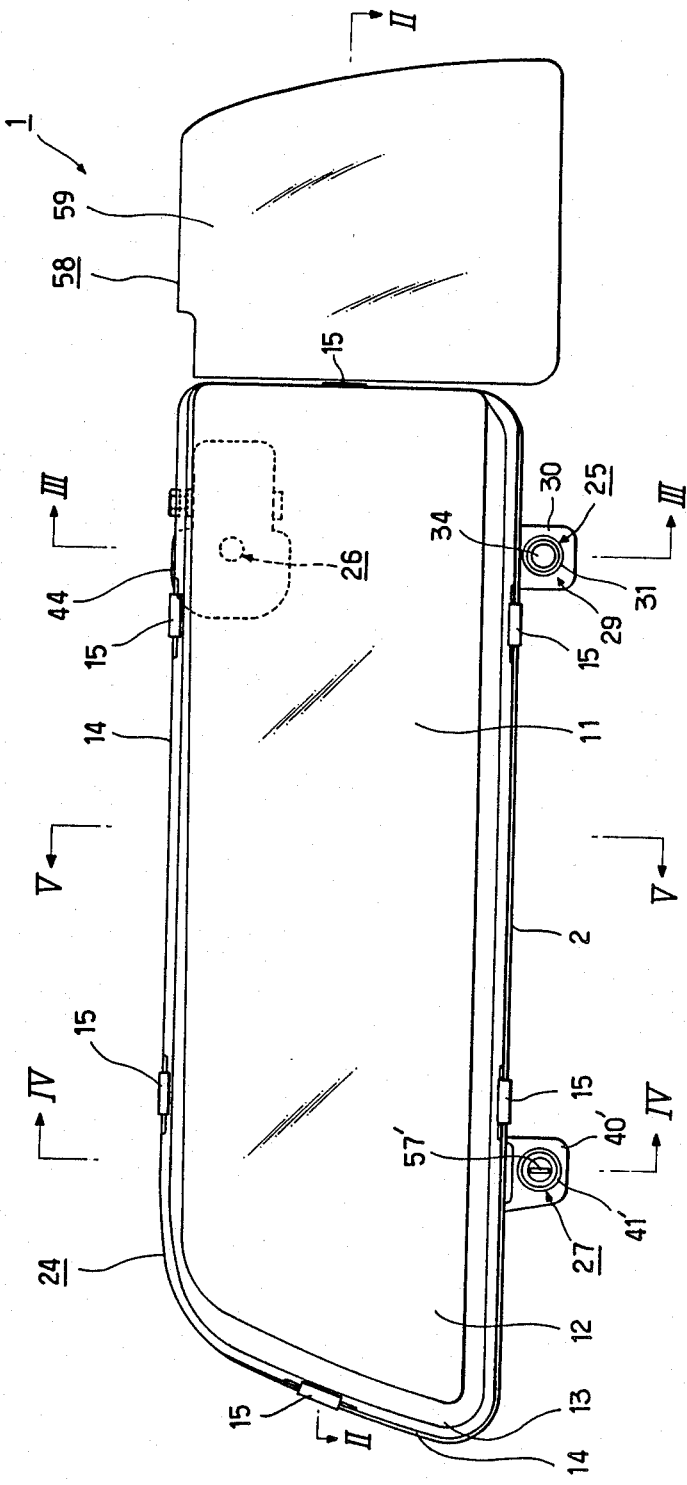
FIG. 1 is a front view of a headlight device according to the present invention.

The drawings show a headlight device 1 according to the invention, which comprises a lamp body 2 formed of a synthetic resin material and including a parabolic surface reflective mirror portion 3. A reflective surface 4 is formed on the inner surface of the mirror portion 3 by applying a reflective coating thereon. An electric bulb mounting hole 5 is formed in the rear end portion of the mirror portion 3, and a relatively short length mounting tube 6 projects rearward from the mounting hole 5.

Auxiliary reflective mirror portions 8 and 8' are formed integrally to the reflective mirror portion 3 to project from the left and right side edges 7 and 7' of the reflective mirror portion 3 toward the opposite sides. The auxiliary reflective mirror portions 8 and 8' are formed such that the portions 8 and 8' are inclined in the forward and outward directions, and have concave front surfaces 9 and 9'. The surfaces 9 and 9' are applied with reflective coatings thereon to form reflective mirror portions respectively.

Figure 5:
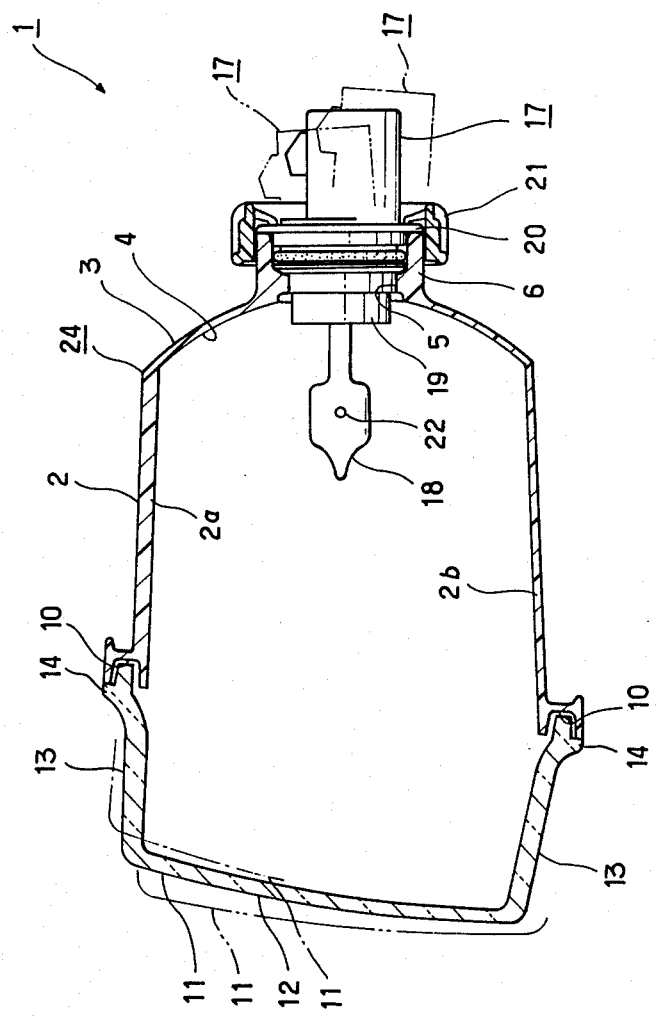
FIG. 5 is an enlarged cross-sectional view taken along line V—V in FIG. 1.

A mounting groove 10 is formed in the circumference of the lamp body 2 to open in the forward direction. As shown in FIG. 5, the upper wall 2a of the lamp body 2 has a thick thickness as compared with the lower wall 2b of the lamp body 2 so that the distortion of the lamp body 2 due to the heat generating from an electric bulb 17.

A lens 11 is mounted on the lamp body 2. The lens 11 shown in the drawings is adapted to be mounted on the left front end of an automobile and has a front surface portion 12 inclining rightward and rearward as viewed from the front, and a side wall portion 13 integrally formed to and extending rearward from the circumference of the front surface portion 12. An engaging projection or ridge 14 is formed on the outer surface of the side wall portion 13 near to the rear end thereof.

In mounting the lens 11 on the lamp body 2, a bonding agent is filled in the mounting groove 10 and the rear end of the side wall portion 13 of the lens 11 is fitted in the groove 10. A plurality of C-clips 15 formed of an elastic metal sheet engage with the front surface of the engaging projection 14 and an engaging projection or ridge 16 which is formed on the rear surface of the outer circumference of the lamp body 2.

The electric bulb 17 includes a bulb portion 18 formed of glass and a socket portion 19 having a flange 20. The bulb 17 is inserted into the mounting tube 6 of the lamp body 2, and the flange 20 of the socket 19 is clamped between the rear surface of the mounting tube 6 and a locking cap 21 which is fitted on the mounting tube 6. The bulb 17 is thus mounted on the lamp body 2, and a filament 22 of the bulb 17 is located on the focus of the reflective surface 4 of the rotational parabolic reflective surface portion 3.

Figure 2:
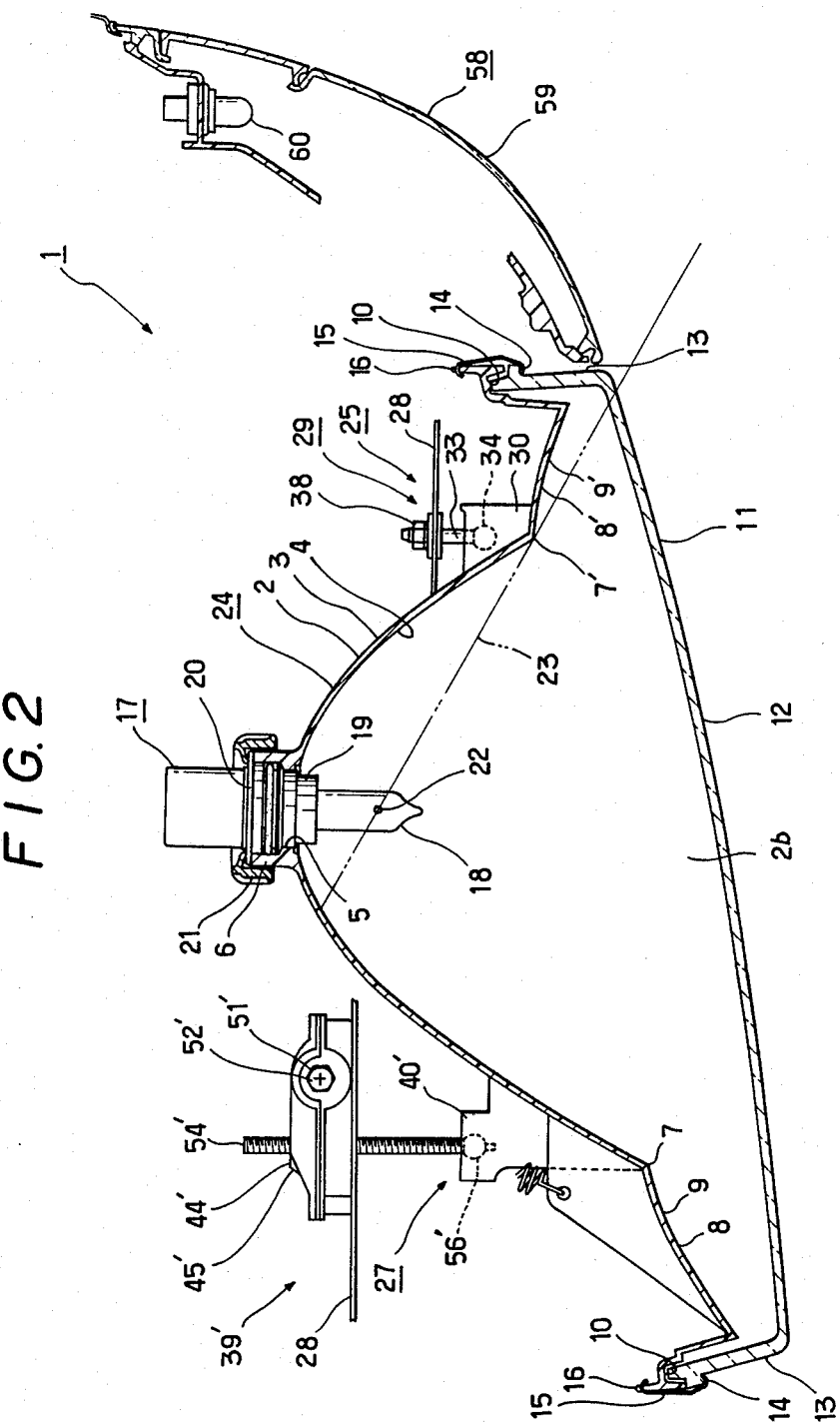
FIG. 2 is a section view taken along line II—II in FIG. 1.

As shown in FIG. 2, a line 23 connecting a boundary edge 7' between the parabolic mirror portion 3 and the auxiliary reflective mirror portion 8' of the right side (as viewed from the front) and the filament 22 of the electric bulb 17 pases on or in front of the front end of the side wall portion 13 of the right side of the lens 11, according to essential feature of the invention.

Thus, an headlight unit 24 is formed.

The headlight unit 24 is connected to a vehicle body 28 at three points 25, 26 and 27. As viewed in FIG. 1, the point 25 is located near to the lower right end, the point 26 near to the upper end and aligning vertically with the point 25, and the point 27 is located near to the left end and aligning horizontally with the point 25. It will be understood that the wording vehicle body may include any member fixed to the body of the vehicle. At the point 25, the headlight unit 24 is connected to the vehicle body through a rotary supporting mechanism 29, and at points 26 and 27 the headlight unit 24 is connected to the vehicle body through aiming mechanisms 39 and 39' respectively.

Figure 3:
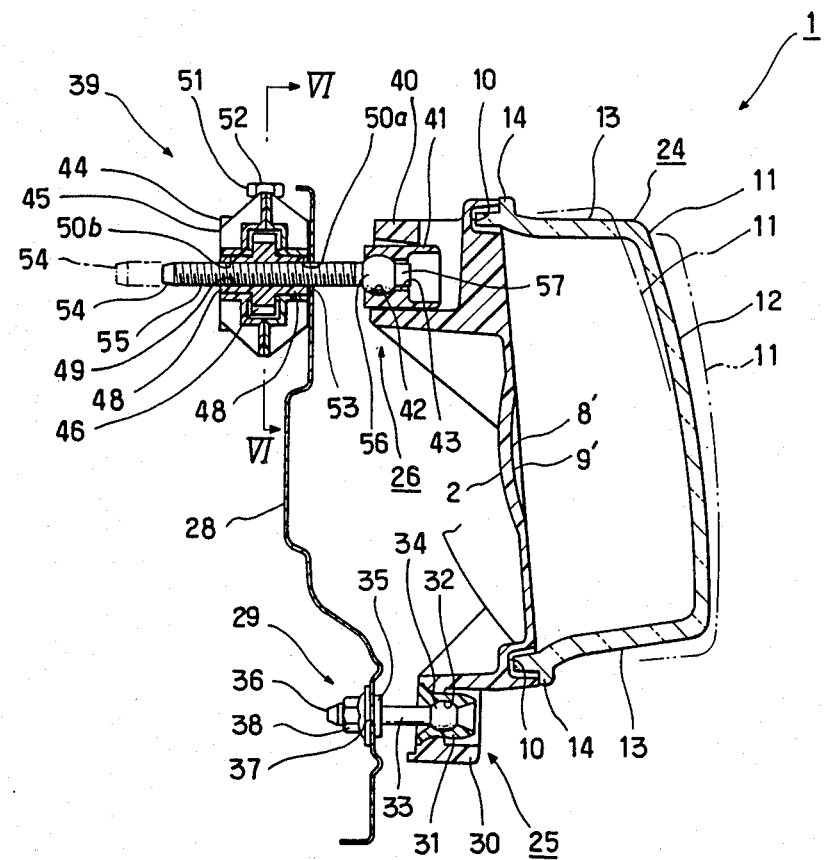
FIG. 3 is an enlarged cross-sectional view taken along line III—III in FIG. 1.

The rotary supporting mechanism 29 comprises, as shown in FIG. 3, a bracket 30 integrally formed on the lower surface of the lamp body 2 to project rearward and downward, and a socket 31 formed of a synthetic resin material and mounted on the bracket 30 and having a spherical recess 32 therein. Further, a supporting rod 33 having on the front end integrally a spherical body 34 is mounted on the vehicle body 28. The supporting rod 33 has a flange 35 and screw-thread portion 36. The screw-thread portion 36 is inserted through a mounting hole 37 formed in the vehicle body 28 and fixed thereto by a nut 38. The nut 38 and the flange 35 cooperate to secure the supporting rod 33 on the vehicle body 28. The spherical body 34 of the rod 33 is rotatably received in the spherical recess 32 in the socket 31, thereby forming the rotary supporting mechanism 29. It will be understood that the point 25 is defined as the center of the spherical body 34 or the spherical recess 32.

The aiming mechanism 39 connects the vehicle body 28 and the headlight unit 24 at the point 26. As shown in FIG. 3, a bracket 40 is integrally formed on the lamp body 2, and supports a socket 41 of a synthetic resin material. A spherical recess 42 is formed in the socket 41. A radially and axially extending engaging recess 43 is formed adjacent to the spherical recess 42.

Figure 6:
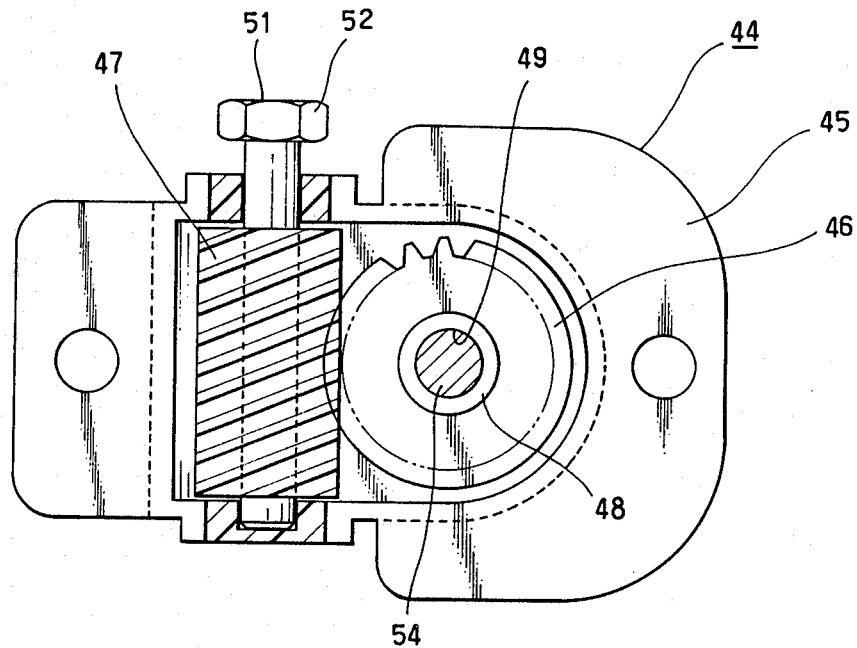
FIG. 6 is an enlarged cross-sectional view taken along line VI—VI in FIG. 3.

A gear unit 44 is mounted on the vehicle body 28 and, as shown in FIGS. 3 and 6, includes a casing 45, a worm wheel 46 rotatably mounted in the casing 45, and a worm gear 47 rotatably mounted in the casing 45 and meshingly engaging with the worm sheel 46. The worm wheel 46 has a boss portion 48 integrally, and screw-thread bore 49 is formed through the boss section 48. The opposite or the front and rear end portions of the boss portion 48 are supported rotatably in bores 50a and 50b respectively, which are formed in the front and rear portions of the casing 45 respectively.

An actuating rod 51 is secured to the worm gear 47, and extends upward through the casing 45. A head portion 52 is integrally formed on the upper end of the rod 51. When the actuating rod 51 is rotated, the rotational movement is transmitted through the worm gear 47 to the worm wheel 46.

The casing 45 of the gear unit 44 is secured to the vehicle body 28, and the threaded bore 49 formed in the worm wheel 46 aligns with an opening 53 formed in the vehicle body 28.

An adjusting rod 54 having an elongated screw-thread rod portion 55, a spherical body portion 56 integrally formed on the front end of the rod portion 55 and a plate-like engaging piece portion 57 projecting from the front end of the spherical body portion 56 passes screw-threadingly through the threaded bore 49 of the worm wheel 46. The spherical body portion 56 of the adjusting rod 54 is rotatably received in the spherical recess 42 of the socket 41 by a limited amount, but the rotation therebetween is prevented by the engagement between the engaging recess 43 in the socket 41 and the engaging piece portion 57.

Thus, when the worm wheel 46 is rotated, the adjusting rod 54 moves forward or rearward in response to the direction of the rotation of the worm wheel 46, since the rotation of the adjusting rod 54 is prevented. And the space between the point 26 and the vehicle body changes, and the headlight unit 24 rotates around a line connecting the points 25 and 27. The rotation of the worm wheel 46 is actuated by rotating the actuating rod 51 of the aiming mechanism 39.

Figure 4:
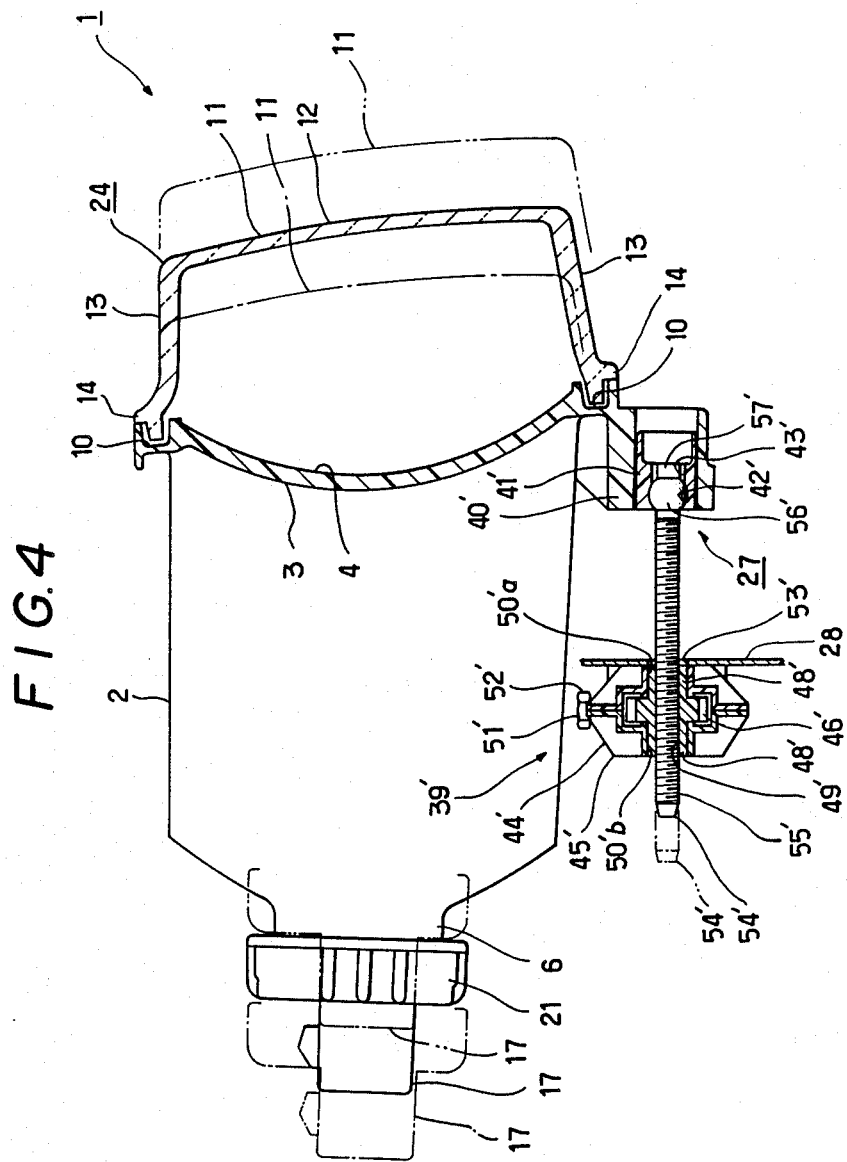
FIG. 4 is an enlarged cross-sectional view taken along line IV—IV in FIG. 1.

The aiming mechanism 39' connecting the headlight unit 24 and the vehicle body 28 at the point 27 has, as shown in FIGS. 2 and 4, the construction substantially the same to the aiming mechanism 39, thus, the description is omitted and corresponding parts are depicted by the same reference numerals with the prime being attached.

It will be understood that the rotation of the adjusting rod 54 relative to the socket 41 or to the gear unit 44 is, in the embodiment, prevented by the engagement between the engaging recess 43 in the socket 41 and the engaging piece portion 57, but any suitable means may be provided at any suitable location.

In the headlight device 1, when the electric bulb is not lit, the light passing through the lens from the outside is reflected by the parabolic reflective mirror portion 3 and also by the auxiliary reflective mirror portions 8 and 8', thus, the mirror portions 3, 8 and 8' are observed to constitute an integral unit.

When the electric bulb 17 is lit, a part of the light emitted from the bulb 17 is reflected at the inner surface of the lens 11 and reflected at the auxiliary reflective mirror portions 8 and 8' and irradiated to the outside, therefore, the portions of the lens 11 corresponding the auxiliary reflective mirror portios 8 and 8' do not constitute dark zones.

Since the auxiliary reflective mirror portions 8 and 8' are formed integrally to the main mirror portion 3 and of a synthetic resin material, thus, the number of parts can be reduced. The mirror portions 8 and 8' are formed to have concave surfaces, which increase the reflective efficiency, and the strength. Further, the boundaries 7 and 7' between the mirror portions 8 and 8' and the main mirror portion 3 act as reinforcing ribs.

As clearly shown in FIGS. 1 and 2, a clearance lamp 58 is provided adjacent to the right side of the headlight unit 24 and comprises a lens 59 and an electric bulb 60. The clearance lamp 58 is mounted on the vehicle body 28 through suitable means.

Since the line connecting the boundary edge 7' between the parabolic mirror portion 3 and the auxiliary mirror portion 8' of the right side of the headlight unit 24 and the filament 22 of the electric bulb 17 passes on or in front of the front end of the side wall portion 13 of the lens 11 (in FIG. 2, the chain line passes in front of the front end of the side wall portion 13), thus, the light emitted from the lamp 17 does not enter into the lens 59 of the clearance lamp 58.

As described heretofore, the headlight device of the invention is of the type including a lamp body formed of a synthetic resin material, a lens covering the front surface of the lamp body and an electric bulb provided in a lamp space defined between the lamp body and the lens, further including a clearance lamp provided adjacent to one side edge of the lamp body. The lamp body has a parabolic surface reflective mirror portion opening in the forward direction, and auxiliary reflective mirror portions extending from the left and right side edge portions of the parabolic surface reflective mirror portion. The auxiliary reflective mirror portions approach the lens in the direction toward the distal edges thereof respectively, and have concave surfaces respectively in the forward direction. The lens has a front surface portion and at least one side wall portion extending in the rear direction from the one side edge of the front surface portion. And an extension of a line connecting the source of light of the electric bulb and a boundary between the side edge of the parabolic surface reflecting mirror portion and the side edge of the auxiliary reflective mirror portion passes on or in front of the front end of the side wall portion of said lens on the side of the clearance lamp.

Therefore, according to the invention, when the electric bulb is not lit, the light passing through the lens from the outside is reflected by the parabolic reflective mirror portion and also by the auxiliary reflective mirror portions, thus, the parabolic reflective mirror portion and the auxiliary reflective mirror portions are observed to constitute an integral unit. When the electric bulb is lit, a part of the light emitted from the bulb is reflected by the inner surface of the lens and by the auxiliary reflective mirror portions, thus, the portions of the lens corresponding the auxiliary reflective mirror portions do not form the dark zone. Further, the line connecting the boundary edge between the parabolic mirror portion and the auxiliary mirror portion on the side of the clearance lamp with the filament of the electric bulb passes on or in front of the front end of the side wall portion of the lens on the side of the clearance lamp, thus, the light emitted from the filament of the electric bulb does not enter into the lens of the clearance lamp.

It will be noted that the invention is not limited by the embodiments described, and various modifications or changes may be applied without departing from the essential principles of the invention.

What is claimed is:

1. A headlight device of the type including a lamp body formed of a synthetic resin material, a lens covering the front surface of the lamp body, an electric bulb provided in a lamp space defined between the lamp body and the lens, and a clearance lamp disposed adjacent to one side edge of the lamp body, wherein said lamp body has a parabolic surface reflective mirror portion opening in the forward direction, and an auxiliary reflective mirror portion extending from the left or right side edge of the parabolic surface mirror portion and adjacent to the clearance lamp, said auxiliary reflective mirror portion approaches the lens in the direction toward the distal edge thereof, and has a concave inner surface in the forward direction, said lens having a front surface portion, and at least one side wall portion extending in the rear direction from said one side edge of the front surface portion adjacent to the clearance lamp, and an extension of a line connecting the source of light of the electric bulb and a boundary between the side edge of the parabolic surface mirror portion and the side edge of the auxiliary reflective mirror portion passes on or in front of the front end of the side wall portion of said lens on the side of the clearance lamp.

2. A headlight device as set forth in claim 1, wherein auxiliary reflective mirror portions are provided on left and right side edges of the parabolic surface mirror portions respectively.

3. A headlight device as set forth in claim 1, wherein said lens has an elongated configuration in the sidewise direction.

4. A headlight device as set forth in claim 1, wherein said clearance lamp is provided with a lens, the front surface of the lens of the clearance lamp and that of said first mentioned lens form a smooth line.

5. A headlight device as set forth in claim 1, wherein the outer edge of the auxiliary reflective mirror in the side-wise direction and remote from the parabolic surface mirror portion is disposed adjacent to the front end of the side wall portion of the lens.

6. A headlight device as set forth in claim 1, wherein the auxiliary reflective mirror portion is formd of synthetic resin material and is integral with the parabolic surface mirror portion.

* * * * *